(12) United States Patent
Nakane et al.

(10) Patent No.: US 7,443,286 B2
(45) Date of Patent: Oct. 28, 2008

(54) ANTI-THEFT SYSTEM FOR VEHICLE AND ANTI-THEFT DEVICE FOR VEHICLE

(75) Inventors: Yoshihide Nakane, Okazaki (JP); Kouichi Masamura, Toyota (JP); Takao Ozawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 240 days.

(21) Appl. No.: 10/571,485

(22) PCT Filed: Feb. 25, 2005

(86) PCT No.: PCT/JP2005/003700

§ 371 (c)(1),
(2), (4) Date: Mar. 14, 2006

(87) PCT Pub. No.: WO2005/082687

PCT Pub. Date: Sep. 9, 2005

(65) Prior Publication Data

US 2008/0042810 A1 Feb. 21, 2008

(30) Foreign Application Priority Data

Mar. 1, 2004 (JP) .............................. 2004-056622

(51) Int. Cl.
*B60R 25/10* (2006.01)
(52) U.S. Cl. .............................. 340/426.18; 340/425.5; 340/426.1; 340/426.15
(58) Field of Classification Search ............. 340/426.18
See application file for complete search history.

(56) References Cited

U.S. PATENT DOCUMENTS

| 5,939,975 | A | * | 8/1999 | Tsuria et al. ........... 340/426.18 |
| 6,337,621 | B1 | * | 1/2002 | Ogino et al. ............. 340/425.5 |
| 6,741,165 | B1 | * | 5/2004 | Langfahl et al. ......... 340/426.1 |
| 6,879,247 | B2 | * | 4/2005 | Shimomura et al. .... 340/426.18 |
| 7,149,623 | B2 | * | 12/2006 | Flick ........................... 701/207 |
| 2003/0179098 | A1 | * | 9/2003 | Ghazarian ................ 340/686.6 |
| 2004/0075539 | A1 | | 4/2004 | Savoie et al. |
| 2004/0130440 | A1 | | 7/2004 | Boulay et al. |
| 2005/0099275 | A1 | * | 5/2005 | Kamdar et al. ......... 340/426.18 |
| 2005/0151628 | A1 | * | 7/2005 | Becker et al. ............ 340/426.1 |

FOREIGN PATENT DOCUMENTS

| DE | 100 27 747 A 1 | 12/2001 |
| EP | 0 484 880 A2 | 5/1992 |
| EP | 1 384 635 A1 | 1/2004 |
| JP | U 5-49524 | 6/1993 |

(Continued)

*Primary Examiner*—Jeff Hofsass
*Assistant Examiner*—Kerri L McNally
(74) *Attorney, Agent, or Firm*—Oliff & Berridge, PLC

(57) ABSTRACT

An anti-theft system for a vehicle includes an on-vehicle machine including reporting means configured to report by radio an illegal activity affecting the vehicle to a designated opponent to be reported to in a case where the illegal activity is detected; and an external facility, the external facility including obstruction radio wave detection means configured to detect a radio wave obstructing the radio-report by the reporting means; and illegal activity prevention means configured to prevent the illegal activity in a case where the radio wave is detected by the obstruction radio wave detection means.

9 Claims, 4 Drawing Sheets

FOREIGN PATENT DOCUMENTS

| | | |
|---|---|---|
| JP | A 8-268231 | 10/1996 |
| JP | A 9-249095 | 9/1997 |
| JP | A-2003-008497 | 1/2003 |
| JP | A-2003-069468 | 3/2003 |
| JP | A 2003-69498 | 3/2003 |
| JP | 2003165417 A * | 6/2003 |
| JP | A-2003-165417 | 6/2003 |
| WO | WO 94/22118 | 9/1994 |
| WO | WO 01/00463 A2 | 1/2001 |
| WO | WO 0100463 A2 | 1/2001 |

* cited by examiner

ANTI-THEFT SYSTEM FOR VEHICLE AND ANTI-THEFT DEVICE FOR VEHICLE

TECHNICAL FIELD

The present invention generally relates to anti-theft systems for vehicles and anti-theft devices for the vehicles, and more particularly, to an anti-theft system for a vehicle and anti-theft device for the vehicle proper for radio-reporting information that an illegal activity such as the theft of a vehicle is detected to an opponent to be given the information, in a case where the illegal activity such as the theft of the vehicle is detected.

BACKGROUND ART

A system for radio-reporting information of the current position of a vehicle and information about the occurrence of illegal use of the vehicle from the vehicle to an owner of the vehicle or a police station, when the vehicle being illegally used is detected, is well known. See Japanese Patent Publication Application No. H09-249095, for example. Furthermore, a system for radio-reporting information about the occurrence of vehicle theft from a vehicle to an owner of the vehicle, when the vehicle being stolen is detected, is also well known. See Japanese Utility Model Registration Publication Application No. H05-49524, for example. According to the above-mentioned conventional systems, when the illegal activity regarding the vehicle such as the theft of the vehicle is detected, the detected information is reported to an opponent to be reported to by radio. Therefore, even if the owner of the vehicle is separated from the vehicle, the owner can be remotely notified about the illegal activity regarding the vehicle and thereby it is possible to attempt to prevent such an illegal activity.

However, in the above-mentioned systems where the report is sent from the vehicle to the opponent to be reported to by the radio communication, if a radio wave obstructing (interfering with) the receipt of the radio report is generated near the vehicle, it is difficult for the information sent from the vehicle to the opponent to be reported to, to be received. Hence, in a case where the illegal activity such as the theft is done to the vehicle, even if the illegal activity is detected, it may not be possible for the opponent to receive the radio report from the vehicle. In the system where the illegal activity affecting the vehicle is remotely reported to the owner of the vehicle, if the obstruction radio wave that obstructs receipt of the radio report is not avoidable, the reliability of the system is decreased.

DISCLOSURE OF THE INVENTION

Accordingly, it is a general object of the present invention to provide a novel and useful anti-theft system for a vehicle and anti-theft device for the vehicle.

Another and more specific object of the present invention is to provide an anti-theft system for a vehicle and anti-theft device for the vehicle whereby it is possible to attempt to prevent an illegal activity regarding a vehicle in a state where radio reporting from the vehicle is obstructed by an obstruction radio wave.

The above object of the present invention is achieved by an anti-theft system for a vehicle, including:

an on-vehicle machine including reporting means configured to report by radio an illegal activity affecting the vehicle to a designated opponent to be reported to in a case where the illegal activity is detected; and an external facility, the external facility including:

obstruction radio wave detection means configured to detect a radio wave obstructing the radio-report by the reporting means; and illegal activity prevention means configured to prevent the illegal activity in a case where the radio wave is detected by the obstruction radio wave detection means.

According to the above-mentioned invention, even if the radio-report from the vehicle is obstructed by the obstruction radio wave so as not be received by a designated opponent to be reported to, the external facility is activated so that the illegal activity affecting the vehicle is prevented. Thus, the illegal activity affecting the vehicle can be prevented in a state where the radio report from the vehicle is obstructed by the obstruction radio wave.

The illegal activity prevention means may issue a warning to an outside as an action to prevent the illegal activity.

According to the above-mentioned invention, the illegal activity affecting the vehicle can be prevented by the warning from the external facility.

The illegal activity prevention means may report the existence of the radio wave to the designated opponent to be reported to as an action to prevent the illegal activity.

According to the above-mentioned invention, the designated opponent to be reported to can know that the obstruction radio wave obstructing the report from the vehicle is generated by receiving a cable report or the radio report from the external facility, so as to know that there is a possibility that the illegal activity affecting the vehicle may occur. Therefore, it is possible to correspond properly, and, as a result of this, the illegal activity affecting the vehicle can be prevented.

The external facility may further include photographing means configured to photograph a parked vehicle, the illegal activity prevention means may report the existence of the radio wave to the designated opponent to be reported to and send an image photographed by the photographing means in a case where the radio wave is detected by the obstruction radio wave detection means.

Even if the person conducts an illegal activity affecting the vehicle while the person sends out the obstruction radio wave, the opponent to be reported to can know that the above-mentioned obstruction radio wave is generated and obtain an image where the illegal activity affecting the vehicle is recorded. Because of this, it is possible to correspond properly, and, as a result of this, the illegal activity affecting the vehicle can be prevented.

The external facility may be provided in a parking lot where an unspecified large number of the vehicles are parked, and the external facility may obtain information necessary for the report from the parked vehicle.

According to the above-mentioned invention, in the parking lot where an unspecified large number of vehicles are parked, an opponent to be reported to that the obstruction radio wave is generated when the external facility detects the obstruction radio wave can be specified for every vehicle.

The above object of the present invention is also achieved by an anti-theft device for a vehicle, including:

reporting means configured to report by radio an illegal activity affecting the vehicle to a designated opponent to be reported to in a case where the illegal activity is detected;

obstruction radio wave detection means configured to detect a radio wave obstructing the radio-report by the reporting means; and illegal activity prevention means configured to prevent the illegal activity in a case where the radio wave is detected by the obstruction radio wave detection means.

According to the above-mentioned invention, even if the radio report from the vehicle is obstructed by the obstruction radio wave so as not to be received by a designated opponent to be reported to, the vehicle is activated so that the illegal activity affecting the vehicle is prevented. Thus, the illegal activity affecting the vehicle can be prevented in a state where the radio report from the vehicle is obstructed by the obstruction radio wave.

The illegal activity prevention means may issue a warning to an outside as an action to prevent the illegal activity.

According to the above-mentioned invention, the illegal activity affecting the vehicle can be prevented by the warning from the vehicle.

Other objects, features, and advantages of the present invention will become more apparent from the following detailed description when read in conjunction with the accompanying drawings.

BEST MODE FOR CARRYING OUT THE INVENTION

A description will now be given, with reference to FIG. 1 through FIG. 4, of embodiments of an anti-theft system for a vehicle and anti-theft device for the vehicle of the present invention.

Figure 1:
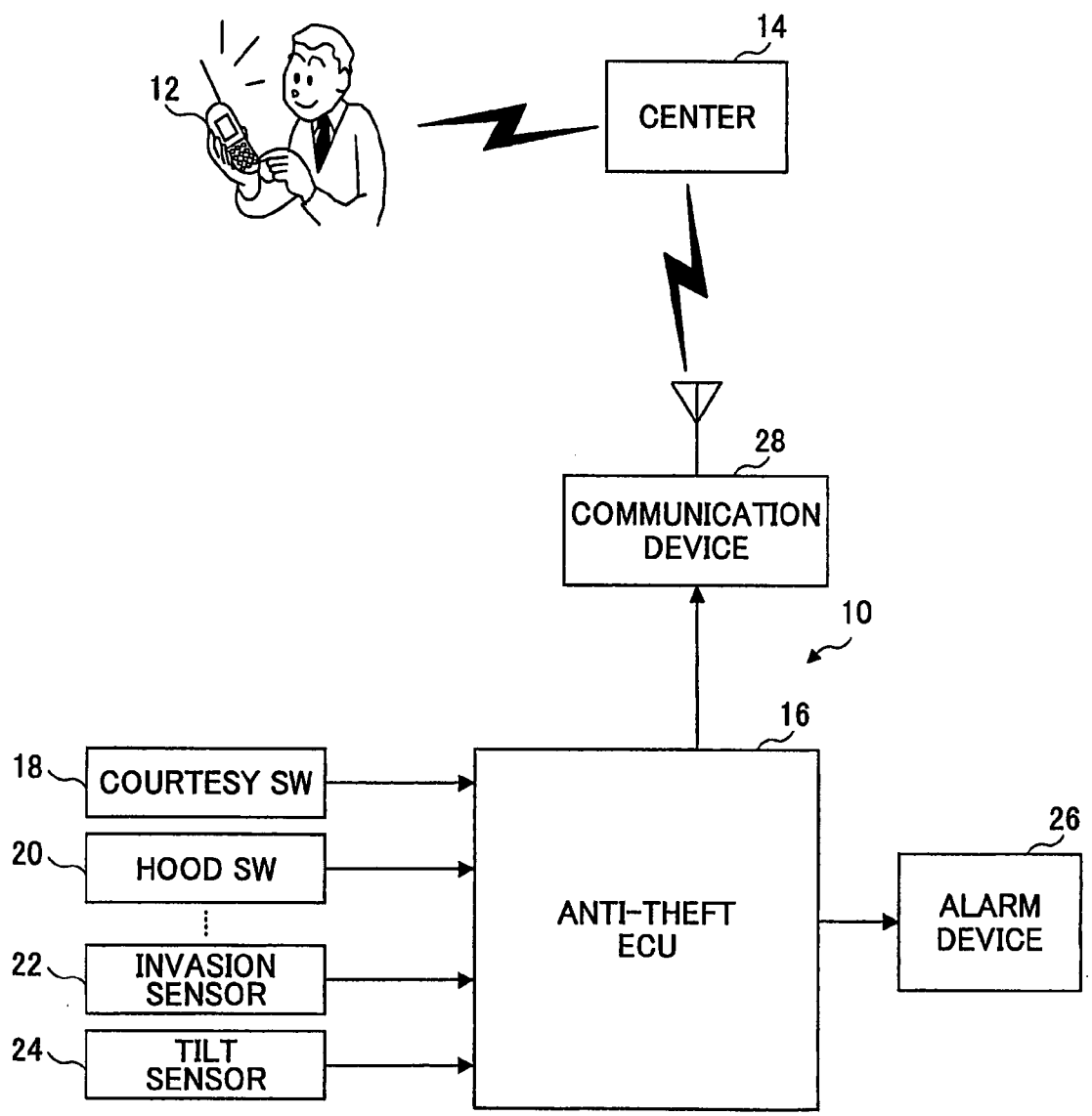
FIG. 1 is a schematic view of a system whereby the theft of a vehicle is prevented according to an embodiment of the present invention.

FIG. 1 is a schematic view of a system whereby the theft of a vehicle is prevented according to the embodiment of the present invention. As shown in FIG. 1, a system of this embodiment includes an anti-theft device 10 for a vehicle that is installed in the vehicle, a portable terminal 12, and a center 14 as an external infrastructure. The portable terminal 12 is, for example, a portable phone or PDA used by a proper owner of the vehicle such as the owner of the vehicle or a driver.

The anti-theft device 10 for the vehicle is a device provided for preventing theft of the vehicle itself, vehicle parts such as a tire or an engine, and an article in the vehicle. The anti-theft device 10 for the vehicle has an electronic control unit (hereinafter "anti-theft ECU") 16 whereby control for anti-theft of the vehicle is performed. A signal for identifying whether a vehicle door is locked or unlocked at the time when the ignition is off, is supplied to the anti-theft ECU 16. In a case where all of the vehicle doors are locked at the time when the ignition is off, the anti-theft ECU 16 is in a security mode so as to watch the vehicle for theft activity based on a supplied lock signal. On the other hand, in a case where a vehicle door is unlocked, the anti-theft ECU 16 is in an un-set mode so as to turn off watching the vehicle for theft activity based on a supplied unlock signal.

As sensors for detecting activities at the time of the vehicle theft, a courtesy switch 18, a hood switch 20, an invasion switch 22, and a tilt sensor 24 are connected to the anti-theft ECU 16. The courtesy switch 18 outputs a signal corresponding to opening and closing the vehicle doors such as a front, rear, or luggage door. The hood switch 20 outputs a signal corresponding to opening and closing a front hood of the vehicle. The invasion switch 22 outputs a signal corresponding to whether a person is invading the inside of the vehicle by using a supersonic wave, for example. In addition, the tilt sensor 24 outputs a signal corresponding to a tilt angle of a shaft in front and rear directions and right and left directions from a horizontal state of the vehicle, namely a roll angle and a pitch angle.

In the above-mentioned security mode for watching for vehicle theft activity, the anti-theft ECU 16 detects an opening and closing state of the vehicle door based on the output signal of the courtesy switch 18, detects an opening and closing state of the vehicle hood based on the output signal of the hood switch 20, detects existence of an invader in the vehicle based on the output signal of the invasion switch 22, and detects a tilt angle from a horizontal state of the vehicle based on the output signal of the tilt sensor 24. Based on the detection results, whether the vehicle door or the vehicle hood is pried open, whether an invader inside the vehicle exists, and whether the vehicle is unintentionally moved by a wrecker or jacked up, are determined. As a result of this, whether the vehicle is being or may be affected by theft is determined.

An alarm device 26 and a communication device 28 are connected to the anti-theft ECU 16. The alarm device 26 follows an operational signal supplied from the anti-theft ECU 16 and issues a warning to signal the theft of the vehicle to the outside of the vehicle, such as a siren, playing a horn, lighting a lamp, or a warning with voice. The communication device 28 can be connected by radio to the center 14 via a communication network by using a radio having a frequency designated in advance. The communication device 28 is connected by communications to the center 14 by following the operational signal supplied from the anti-theft ECU 16 so as to report by radio the theft of the vehicle together with ID information regarding the vehicle, or the owner or user of the vehicle, to the center 14.

In a case where the center 14 receives information (theft information) about the theft of the vehicle from the communication device 28 of the anti-theft device 10 for the vehicle, the center 14 identifies the user of the vehicle who is registered as a user in advance based on the ID information included in the received information. The center 14 reports the theft of the vehicle to the portable terminal 12 of the proper user of the vehicle by electronic mail via the radio or the Internet. In a case where the portable terminal 12 receives the report regarding the theft of the vehicle from the center 14, the portable terminal 12 displays or outputs with voice from a speaker information about the theft of the vehicle, such as "the vehicle is jacked up and may be stolen" or "the invader of the vehicle is found".

Thus, in the system of this embodiment, in the case where the theft activity of the vehicle is detected by the anti-theft device 10 provided in the vehicle, the report about the theft activity affecting the vehicle is sent from the anti-theft device 10 to the portable terminal 12 of the user of the vehicle via the center 14. Hence, the proper user of the vehicle can know about the theft of the vehicle and specify details of the theft activity such as jacking up, moving by a wrecker, invasion into the vehicle, or the like. Therefore according to the system of this embodiment, even if the proper user of the vehicle is remote from the vehicle, the user can know the information about the theft of the vehicle and therefore can respond to this information, so that it is possible to improve a property of preventing the theft of the vehicle.

Figure 2:
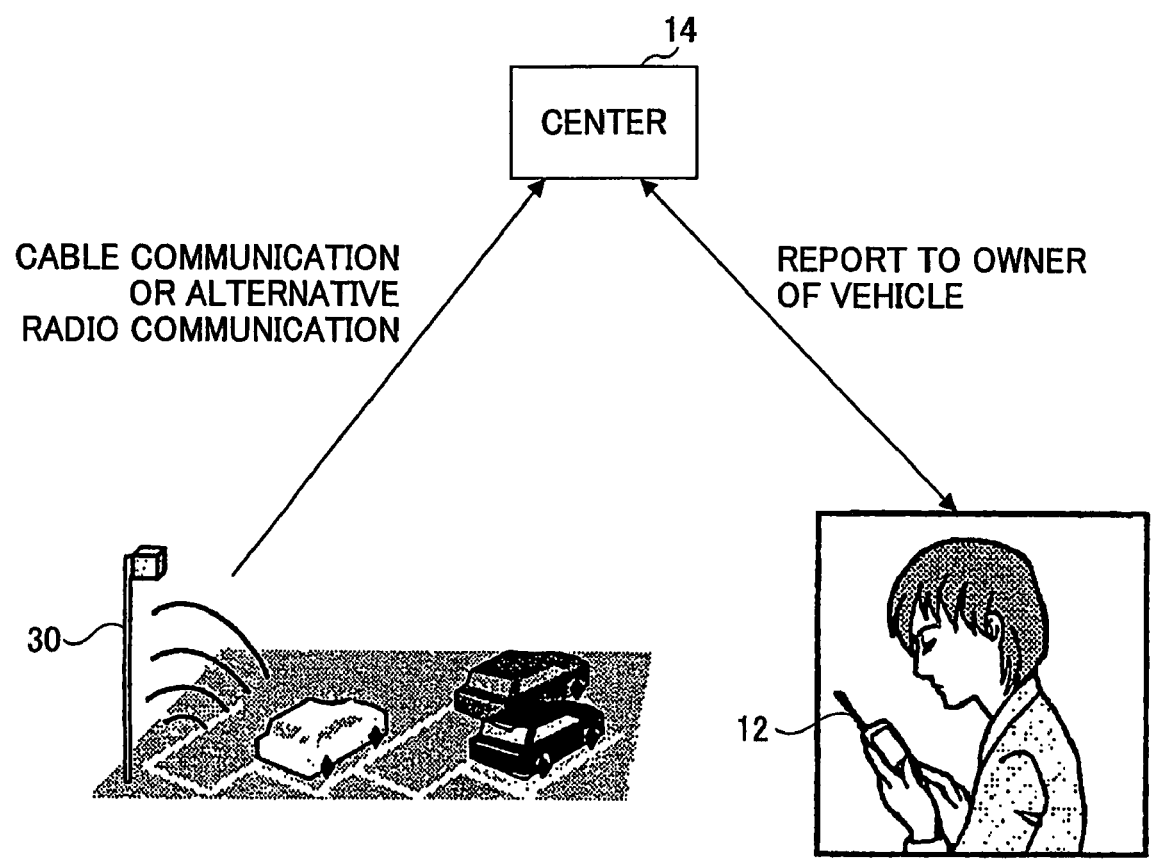
FIG. 2 is a schematic view of a main part of the system of the embodiment of the present invention.
Figure 3:
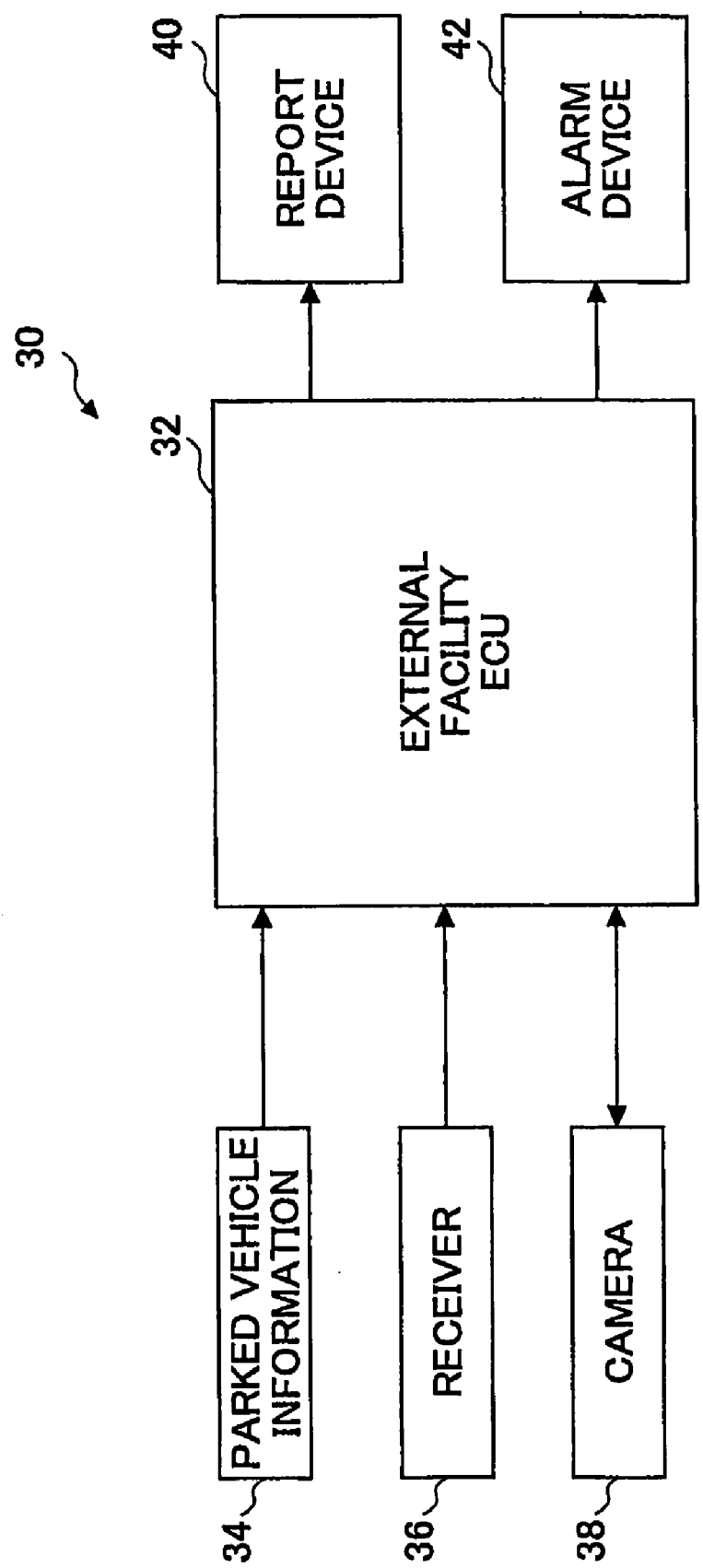
FIG. 3 is a block diagram of an external facility arranged in the system of the embodiment of the present invention.

FIG. 2 is a schematic view of a main part of the system of the embodiment of the present invention. FIG. 3 is a block diagram of an external facility 30 arranged in the system of the embodiment of the present invention. The system of this embodiment includes the external facility 30 provided at a general parking lot where an unspecified large number of vehicles park or at a parking lot of the user's house, together with the anti-theft device 10 provided in the vehicle, the portable terminal 12 of the user of the vehicle, and the center 14.

The external facility 30 is provided to detect the obstruction radio wave (broadband jamming wave). The obstruction radio wave interferes with a radio used for receiving the theft report from the communication device 28 of the anti-theft device 10 provided in the vehicle transmitted to the center and thus obstructs the theft report. It is preferable that one of the external facilities 30 be provided one by one for each parking space of a single vehicle. However, a single external facility 30 may be provided for parking spaces for plural vehicles.

The external facility 30 includes an electronic control unit (hereinafter "external facility ECU") 32. Equipment 34 is connected to the external facility ECU 32 for obtaining information about a vehicle parked in a parking space covered by the external facility 30, more specifically ID information of the vehicle or the user of the vehicle (hereinafter "parked vehicle information"). The equipment 34 reads out, for example, a number or mark indicated on a number plate of the vehicle parked in the parking space via an imaging process or the like. The information read out by the equipment 34 is supplied to the external facility ECU 32. The external facility ECU 32 obtains the parked vehicle information of the vehicle parked in the parking space based on the information from the equipment 34. In a case of the user's parking lot where the parked vehicle is known in advance, the parked vehicle information may be stored in the external facility ECU 32 in advance.

A receiver 36 configured to detect the above-mentioned obstruction radio wave generated at the parking lot or the like is connected to the external facility ECU 32. The receiver has an antenna provided at the parking lot. Based on a state of the radio wave received by the antenna, the receiver 36 detects the existence of the obstruction radio wave obstructing the theft report using the radio wave from the vehicle to the center 14, by obtaining an obstruction radio wave specific spectrum at the frequency band the same as the radio wave used for sending from the communication device 28 of the vehicle, or by determining whether specific features existing in a spectrum, a timing of sending and receiving, or protocol are included in the received radio wave, corresponding to the communication methods of the communication device 28. Detection information of the obstruction radio wave obtained by the receiver 36 is supplied to the external facility ECU 32. The external facility ECU 32 determines, based on the detection information of the receiver 36, whether the obstruction radio wave obstructing the theft report from the vehicle to the center 14 exists at the parking lot or the like.

A camera 38 is connected to the external facility ECU 32. The camera 38 provided at the parking lot can photograph a parking space at least covered by the external facility 30. It is preferable that the camera 38 be an infrared camera, considering photographing at night. The camera 38 may be a camera having a flash function. Following an operational signal supplied from the external facility ECU 32, the camera 38 photographs an area including the parking space designated in advance. An image photographed by the camera 38 is supplied to the external facility ECU 32. The external facility ECU 32 can obtain the image photographed by the camera 38.

A report device 40 and an alarm device 42 provided at the parking lot are connected to the external facility ECU 32. The report device 40 can send communications to the center 14 by cable or radio. In a case where the report device 40 is communicating by radio, it is necessary to use a frequency different from the frequency of the radio used at the time of the theft report by the vehicle so that there is no influence from the obstruction radio wave. Following the operational signal supplied from the external facility ECU 32, the report device 40 sends the communication to the center 14. As described below, the report device 40 reports the existence of the obstruction radio wave obstructing the theft report from the vehicle to the center 14 together with the parked vehicle information of the vehicle positioned in the parking space covered by the external facility 30, to the center 14. In the following, this report is called obstruction radio wave report. Following the operational signal supplied from the external facility ECU 32, the warning device 42 issues a warning to the outside of the facility, such as a siren, lighting a lamp, or a warning with voice, to signal the existence of the obstruction radio wave.

Next, a characteristic operation of the system in this embodiment is discussed.

As described above, in the system of this embodiment, when the vehicle theft activity is detected by the anti-theft device 10 provided in the vehicle, the communication device 28 of the anti-theft device 10 reports by radio about the vehicle theft activity to the center 14 by using a radio wave having a designated frequency band in order to report the theft of the vehicle to the user of the vehicle. Such a radio report is properly realized when a communication state between the anti-theft device 10 and the center 14 is kept well. However, it is difficult to properly realize such a radio report when the communication state between the anti-theft device 10 and the center 14 is not kept well due to generation of the obstruction radio wave in the vicinity of the place where the vehicle is parked. If the theft report is not received by the center 14, information about the vehicle theft is not reported to the portable terminal 12 of the user of the vehicle. Therefore, in the above-mentioned system, even if the vehicle theft activity is detected by the anti-theft device 10, a situation where the user of the vehicle cannot know about the theft of his/her own vehicle due to the obstruction radio wave may happen.

Accordingly, in the system of this embodiment, in order to prevent a decrease of the reliability of a system whereby the theft of the vehicle is remotely reported to the user of the vehicle by using a radio wave, the existence of the obstruction radio wave obstructing the theft report sent by the vehicle is determined and a possibility that the user of the vehicle may not know about the theft of his/her own vehicle due to the obstruction radio wave is reported to the user of the vehicle if the obstruction radio wave is detected so that existence of the obstruction radio wave is known. As a result of this, the user of the vehicle can recognize that there is a possibility of the theft of the vehicle.

More specifically, in the system of this embodiment, the external facility 30 detecting the obstruction radio wave is provided at the parking lot where the vehicle having the anti-theft device 10 is parked. In the parking lot where the such an external facility 30 is provided, it is possible to detect the obstruction radio wave, using a radio wave having a designated frequency from the communication device of the anti-theft device 10 provided in the vehicle, obstructing receipt of the theft report by the center 14.

In this embodiment, when the external facility ECU 32 of the external facility 30 determines, based on the detection information of the receiver 36, that the obstruction radio wave obstructing the theft report using radio wave sent from the vehicle to the center 14 exists at the parking lot, the external facility ECU 32 supplies the operational signal to the warning device 42 and the operational signal to the report device 40 together with the parked vehicle information of the vehicle positioned in the parking space. Following the operational signal being supplied from the external facility ECU 32, the warning device 42 issues a warning to the outside of the facility, such as a siren, lighting a lamp, or a warning with voice, to signal the existence of the obstruction radio wave. Following the operational signal being supplied from the external facility ECU 32, the report device 40 communicates to the center 14. The report device 40 reports the existence of the obstruction radio wave to the center 14 together with the parked vehicle information of the vehicle positioned in the parking space.

When determining that the obstruction radio wave exists, the external facility ECU 32 supplies the operational signal to the camera 38 so that the camera 38 is ordered to photograph inside of the parking space. The external facility ECU 32 sends orders to the report device 40 so that the information about the photographed image obtained by the camera 38 is sent to the center 14 together with the obstruction radio wave report or after the obstruction radio wave report is sent. The report device 40 sends the information about the photographed image obtained by the camera 38 to the center 14 when or after the obstruction radio wave report is sent to the center 14.

When receiving the obstruction radio wave report from the external facility 30 connected by communications to the center 14, the center 14 identifies the user, which user is registered in advance, of the vehicle to which an influence of the obstruction radio wave is given, based on the ID information included in the received information. The center 14 reports that the vehicle theft report is not received due to the existence of the obstruction radio wave, to the portable terminal 12 of the proper user of the vehicle by electronic mail via the radio or the Internet. In a case where the center 14 receives the information about the photographed image of the camera 38 from the external facility 30, the center 14 sends the information about the photographed image to the portable terminal 12 of the user of the vehicle based on a request of the user of the vehicle via the portable terminal 12 after or immediately after the obstruction radio wave report is sent to the portable terminal 12.

In a case where the portable terminal 12 receives the report regarding the theft of the vehicle from the center 14, the portable terminal 12 displays or outputs with voice from a speaker about the possibility that the vehicle theft report is not realized due to the existence of the obstruction radio wave even if the vehicle is stolen. When the information about the photographed image of the camera 38 from the center 14 is received, the photographed image is displayed.

Figure 4:
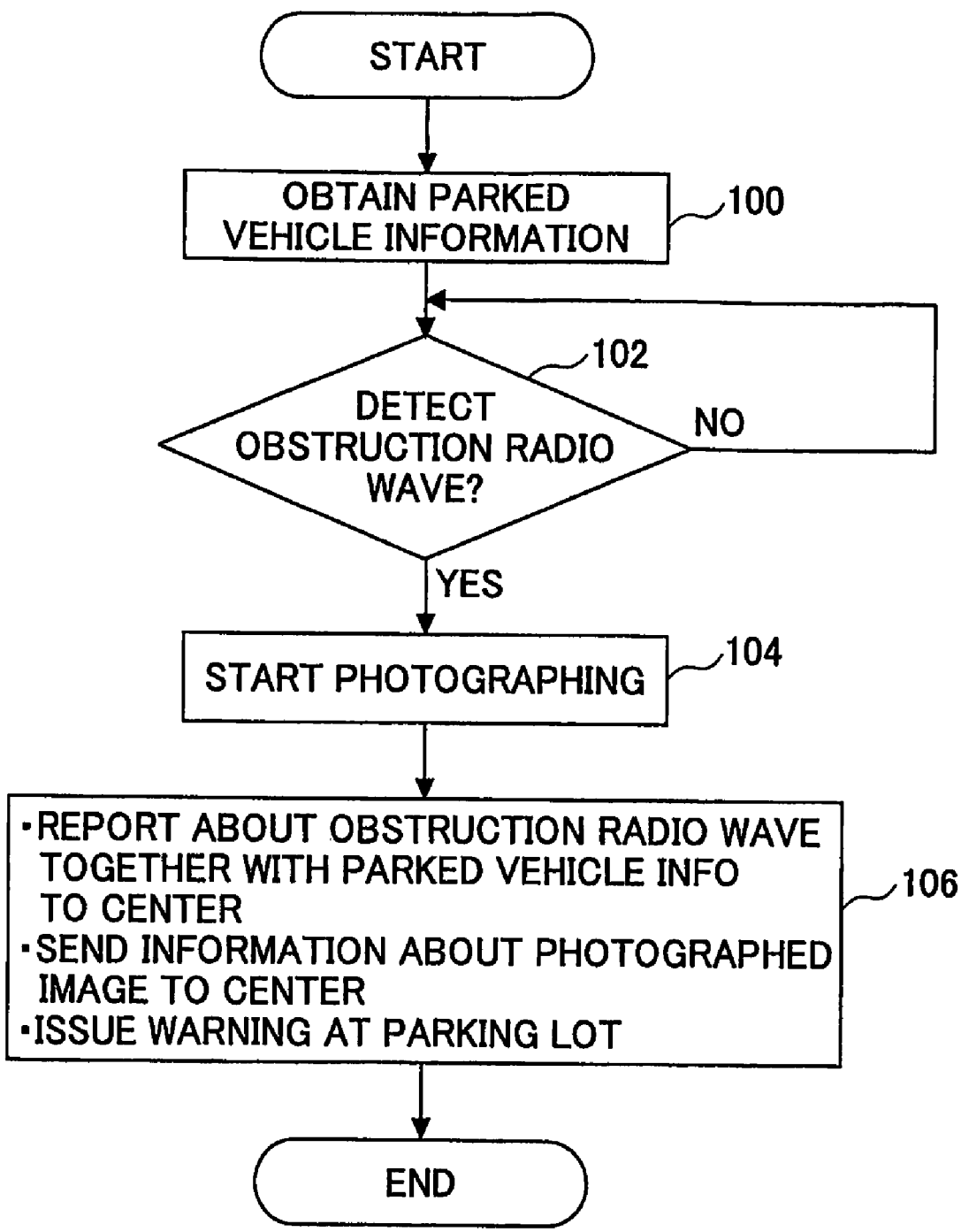
FIG. 4 is a control flowchart performed by the external facility in the system of the embodiment of the present invention.

FIG. 4 is an example of a control flowchart performed by the external facility ECU 32 of the external facility 30 in the system of the embodiment of the present invention. A routine shown in FIG. 4 is repeated every designated time. After the routine shown in FIG. 4 is started, a process of step 100 is implemented.

A process whereby parked vehicle information of the parked vehicle is obtained every parking of the vehicle in the parking space covered by the external facility 30, is implemented in the step 100. Based on the process of the step 100, the ID information of the parked vehicle parked in the parking space corresponding to the external facility ECU 32 or the user of the vehicle is obtained after this.

In step 102, based on the detection information of the receiver 36, whether the obstruction radio wave obstructing the theft report using the radio wave having a designated frequency from the communication device 28 of the vehicle to the center 14 is detected is determined. A process of step 102 is repeated until the obstruction radio wave is detected and the existence of the obstruction radio wave is determined. As a result of this, in a case where it is determined that the obstruction radio wave is detected, a process of step 104 is implemented.

In step 104, a process whereby photographing by the camera 38 is started based on a supply of the operational signal ordering the camera 30 to photograph the corresponding parking space is implemented. Based on the process of step 104, the information about the photographed image by the camera 38 regarding the parking space corresponding to the external facility ECU 32 is obtained after this.

In step 106, by supplying the operational signals to the report device 40 and the warning device 42, the obstruction radio wave report is provided to the center 14 so that the existence of the obstruction radio wave and the parked vehicle information of the vehicle actually parked in the parking space obtained in step 100 are reported, and the information about the photographed image by the camera 38 obtained in step 104 is sent to the center 14. Furthermore, a process whereby a warning to notify that the obstruction radio wave exists near the external facility 30 is issued is implemented. The process of step 103 and thereby the report from the report device 40 or the like is received by the center 14, so that, after this, the center 14 identifies the user of the vehicle to which an influence of the obstruction radio wave is given based on the parked vehicle information included in the received information, reports that the vehicle theft report is not realized due to the existence of the obstruction radio wave to the portable phone 12 of the user, and sends the information about the photographed image by the camera 38 if necessary.

According to the routine shown in FIG. 4, in a case where the obstruction radio wave to obstruct the theft report from the vehicle to the center 14 exists, regardless of whether the anti-theft device 10 of the vehicle detects the vehicle theft activity, the report device 40 of the external facility 30 is operated so as to report the existence of the obstruction radio wave to the center 14 by cable or radio, and the warning about the existence of the obstruction radio wave near the external facility 30 or the parked vehicle is issued by operating the warning device 42. In a case where the center 14 has received the obstruction radio wave report from the external facility 30, that the vehicle theft report from the vehicle is not properly realized due to the existence of the obstruction radio wave is reported to the portable terminal 12 of the user of the vehicle to which the influence of the obstruction radio wave is given.

In the above-discussed system, when the obstruction radio wave exists at the parking lot where the vehicle is parked, the vehicle theft report from the vehicle to the center 14 based on detection of the vehicle theft activity is obstructed due to the existence of the obstruction radio wave regardless of the detection of the vehicle theft activity, that is the vehicle theft report from the vehicle is not received by the center 14. Because of this, the existence of the obstruction radio wave is reported from the external facility 30 to the center 14 and then from center 14 to the portable terminal 12 of the user of the vehicle to which the influence of the obstruction radio wave is given, and the warning of this is issued by the warning device 42.

In this case, even if a person attempting to steal the vehicle generates the obstruction radio wave and starts to steal the vehicle, the external facility 30 detects the obstruction radio wave so as to be operated to prevent the vehicle theft activity. Hence, it is possible to report about the possibility of the vehicle theft activity to the user of the vehicle situated remotely from the center 14 or the vehicle or situated in the parking lot. Therefore, according to the system of this embodiment, even if the radio report from the vehicle to the center 14 is obstructed due to the existence of the obstruction radio wave, the theft activity affecting the vehicle can be prevented by the obstruction radio wave report. Thus, the vehicle theft can be prevented.

In the system of this embodiment, when the obstruction radio wave exists at the parking lot where the vehicle is parked, the camera 38 starts photographing based on the existence of the obstruction radio wave. The information about the photographed image by the camera 38 is sent from the external facility 30 to the center 14 and then from center 14 to the portable terminal 12 of the user of the vehicle to which the influence of the obstruction radio wave is given. Even if a person attempting to steal the vehicle generates the obstruction radio wave and starts to steal the vehicle, the external facility 30 supplies the image where the vicinity of the vehicle is photographed to the center 14 or the portable terminal 12 of the user of the vehicle. Hence, it is possible to report about the situation of the vehicle theft to the user of the vehicle situated remotely from the center 14 or the vehicle via the photographed image by the camera. Therefore, according to the system of this embodiment, even if the radio report from the vehicle to the center 14 is obstructed due to the existence of the obstruction radio wave, the theft activity affecting the vehicle can be prevented by supplying the photographed image by the camera 38.

In the system of this embodiment, the external facility 30 obtains the parked vehicle information of the vehicle parked in the parking space covered by the external facility 30 in advance and supplies both the obstruction radio wave report and the obtained parked vehicle information to the center 14. The center 14 reports that the vehicle theft report is not received due to the existence of the obstruction radio wave, only to the portable terminal 12 of the user of the vehicle to which the influence of the obstruction radio wave is given and which is identified based on the parked vehicle information included in the received information from the external facility 30. Under this structure, it is possible to identify the user of the vehicle to which the influence of the obstruction radio wave is given even in a parking lot where an unspecified large number of vehicles are parked, and to report the existence of the obstruction radio wave from the external facility 30 only to the user of the vehicle via the center 14. Therefore, according to the system of this embodiment, it is possible to prevent a state where the report about the obstruction radio wave is sent to a user of a vehicle for whom the report is unnecessary.

Meanwhile, the anti-theft device 10 corresponds to "on-vehicle machine" mentioned in the following claims. The center 14 or the portable terminal 12 corresponds to "a designated opponent to be reported to" in the following claims. The camera 38 corresponds to "photographing means" in the following claims. "Reporting means" mentioned in the following claims are realized by operating the communication device 28 so that the vehicle theft report is sent to the center 14 in a case where the anti-theft ECU 16 of the anti-theft device 10 detects the vehicle theft activity by using the switches or sensors 18 through 24. "Obstruction radio wave detection means" mentioned in the following claims are realized by the external facility ECU 32 of the external facility 30 detecting the obstruction radio wave obstructing the theft report from the vehicle to the center 14 by using the receiver 36. "Illegal activity prevention means" mentioned in the following claims are realized by implementing a process of step 106 in the routine shown in FIG. 4.

The present invention is not limited to these embodiments, but variations and modifications may be made without departing from the scope of the present invention.

The present invention is not limited to these embodiments, but variations and modifications may be made without departing from the scope of the present invention.

In the above embodiment, when the vehicle theft activity is detected, the report from the communication device 28 and the warning from the warning device 26 are implemented. However, only the report from the communication device 28 may be implemented. In addition, in the above embodiment, when the obstruction radio wave is detected, the report from the report device 40 and the warning from the warning device 42 are implemented. However, only one of them may be implemented.

In the above embodiment, jacking up of the vehicle, intentional swinging of the vehicle, moving the vehicle by a wrecker detected by the tilt sensor 18, and the existence of an invader in the vehicle detected by the invasion sensor 20, are assumed as detailed contents of the theft activity detected as the vehicle theft activity. However, two or more of them may be assumed as detailed contents of the theft activity detected as the vehicle theft activity. In addition, breaking glass detected by a glass breaking sensor may be assumed as the detailed contents of the theft activity detected as the vehicle theft activity.

In the above-discussed embodiment, the theft report from the anti-theft device 10 of the vehicle and the obstruction radio wave report from the external facility 30 are sent to the portable terminal 12 of the user of the vehicle via the center 14. These reports may be sent to a police station, a manager of the parking lot, or a fixed telephone of the user of the vehicle.

In above-discussed embodiment, the external facility 30 provided at the external parking lot is used as a device detecting the obstruction radio wave obstructing the theft report using a radio wave from the vehicle to the center 14. However, the present invention is not limited to this and may be applied to a system where the obstruction radio wave detection device is provided in the vehicle. That is, a receiver detecting the obstruction radio wave is provided in the vehicle, an information transmission system between the parked vehicle and a road side machine provided in the parking lot is formed by, for example, infrared that is not influenced by the obstruction radio wave in order to report that the vehicle has received the obstruction radio wave to the center 14, and the road side machine and the center are connected by cable. In this system, in a case where the obstruction radio wave obstructing the radio theft report from the vehicle to the center 14 is detected, it is possible to issue the warning about the existence of the obstruction radio wave by operating the warning device 26, and send the obstruction radio wave report to the center 14 via the road side machine without receiving an influence of the obstruction radio wave from the vehicle. Hence, it is possible to obtain the same effect as the system of the above discussed embodiment.

In this case, "obstruction radio wave detection means" mentioned in the following claims are realized by the on-vehicle machine detecting the obstruction radio wave obstructing the theft report from the vehicle to the center 14 by using the receiver. In addition, "illegal activity prevention means" mentioned in the following claims are realized by issuing the warning about the existence of the obstruction radio wave by operating the warning device 26, and by reporting the existence of the obstruction radio wave to the center 14 via the road side machine by using the infrared, for example, when the obstruction radio wave is detected.

The invention claimed is:

1. An anti-theft system for a vehicle, comprising:
an on-vehicle unit including reporting means configured to report, by radio, an illegal activity affecting a vehicle with ID information of the vehicle or a user of the vehicle to a center in a case where the illegal activity to the vehicle is detected; and
an external facility provided at a site where the vehicle having the on-vehicle unit is located, the external facility including:
ID information obtaining means configured to obtain ID information of the vehicle located at the site or of a user of the vehicle;
obstruction radio wave detection means configured to detect a radio wave obstructing the radio report by the reporting means; and
illegal activity prevention means configured to report the existence of the obstructing radio wave with ID information obtained by the ID information obtaining means to the center by using a frequency different from a frequency used for the radio report by the radio reporting means as an action to prevent the illegal activity in a case where the obstructing radio wave is detected by the obstruction radio wave detection means.

2. The anti-theft system for a vehicle of claim 1, wherein the illegal activity prevention means issues a warning to an outside of the vehicle as another action to prevent the illegal activity.

3. The anti-theft system for a vehicle of claim 1,
wherein the external facility further includes photographing means configured to photograph the vehicle located at the site, and
the illegal activity prevention means reports, by radio, the existence of the obstructing radio wave with the ID information obtained by the ID information obtaining means to the center by using the frequency different from the frequency used for the radio report by the reporting means, and sends, by radio, an image photographed by the photographing means in a case where the obstructing radio wave is detected by the obstruction radio wave detection means.

4. The anti-theft system for a vehicle of claim 3,
wherein the external facility is provided in a parking lot where an unspecified large number of vehicles are parked, and
the external facility obtains information necessary for the report from at least one of the parked vehicles.

5. The anti-theft system for a vehicle of claim 1, wherein the center includes:
first user specifying means configured to specify the user of the vehicle when the radio report by the reporting means of the on-vehicle unit is received;
first terminal reporting means configured to report, by radio, that the illegal activity is performed to the vehicle after the radio report by the reporting means of the on-vehicle unit is received, to a portable terminal of the user specified by the first user specifying means;
second user specifying means configured to specify the user of the vehicle located at the site where the external facility is provided when the radio report by the illegal activity prevention means of the external facility is received; and
second terminal reporting means configured to report, by radio, that the obstructing radio wave exists after the radio report by the illegal activity prevention means of the on-vehicle unit is received, to a portable terminal of the user specified by the second user specifying means.

6. An anti-theft method for a vehicle, comprising:
reporting by an on-vehicle unit, by radio, an illegal activity affecting a vehicle, with ID information of the vehicle or a user of the vehicle, to a center in a case where the illegal activity to the vehicle is detected;
obtaining ID information of the vehicle located at a site or a user of the vehicle, by an external facility provided at the site where the vehicle having the on-vehicle unit is located;
detecting a radio wave obstructing the radio report by the external facility; and
reporting the existence of the obstructing radio wave, with the obtained ID information, to the center by using a frequency different from a frequency used for the radio report by radio of the illegal activity as an action to prevent the illegal activity in a case where the obstructing radio wave is detected by the external facility.

7. The anti-theft method for a vehicle of claim 6, further comprising:
issuing a warning to an outside of the vehicle as another action to prevent the illegal activity.

8. The anti-theft method for a vehicle of claim 6, further comprising:
photographing the vehicle by the external facility; and
reporting the existence of the obstructing radio wave, with the report of the obtained ID information by radio, to the center by using a frequency different from the frequency used for radio report, and
sending a photographed image, by radio, in a case where the obstructing radio wave is detected.

9. The anti-theft method for a vehicle of claim 6, further comprising:
specifying, by the center, the user of the vehicle when the radio report is received;
reporting, by the center, by radio, that the illegal activity is performed to the vehicle, after the radio report is received, to a portable terminal of the specified user;
specifying, by the center, the user of the vehicle located at the site where the external facility is provided when the radio report is received; and
reporting, by the center, by radio, that the obstructing radio wave exists after the radio report is received, to a portable terminal of the specified user.

* * * * *